United States Patent [19]
Wimolkiatisak et al.

[11] Patent Number: 5,843,524
[45] Date of Patent: Dec. 1, 1998

[54] VINYL HALIDE POLYMER COLOR CONCENTRATE

[75] Inventors: Surachai Wimolkiatisak, Strongsville; Dennis L. Hammond, Richfield; Anthony S. Scheibelhoffer, Norton, all of Ohio; Allen W. Carlson, Ridgewood, N.J.; Mir L. Ali, Bryan, Ohio

[73] Assignee: Ferro Corporation, Cleveland, Ohio

[21] Appl. No.: 796,603

[22] Filed: Feb. 7, 1997

Related U.S. Application Data

[63] Continuation of Ser. No. 524,077, Sep. 6, 1995, abandoned, which is a continuation of Ser. No. 170,460, Dec. 20, 1993, abandoned.

[51] Int. Cl.[6] .................................................. B05D 7/00
[52] U.S. Cl. ........................................ 427/212; 427/222
[58] Field of Search .................................. 427/212, 222, 427/218, 220; 428/403

[56] References Cited

U.S. PATENT DOCUMENTS

| | | | |
|---|---|---|---|
| 3,591,409 | 7/1971 | Aubrey et al. | 117/100 C |
| 3,819,560 | 6/1974 | Kehr | 260/31.8 M |
| 4,375,520 | 3/1983 | Pennie et al. | 521/57 |
| 4,495,128 | 1/1985 | Stoffelsma | 264/211 |
| 5,066,422 | 11/1991 | Felter et al. | 252/511 |
| 5,139,817 | 8/1992 | Abe et al. | 427/54.1 |
| 5,264,280 | 11/1993 | Chundury et al. | 428/330 |

FOREIGN PATENT DOCUMENTS

| | | |
|---|---|---|
| 1011009 | 5/1977 | Canada . |
| 2006350 | 6/1990 | Canada . |
| 328724 | 8/1989 | European Pat. Off. . |
| 04714 63 A2 | 7/1991 | European Pat. Off. . |
| 0471463 | 7/1991 | European Pat. Off. . |
| 471463 | 2/1992 | European Pat. Off. . |
| 842587 | 7/1960 | United Kingdom . |
| 2056462 | 3/1981 | United Kingdom . |

*Primary Examiner*—Brian K. Talbot
*Attorney, Agent, or Firm*—Renner, Otto, Boisselle & Sklar

[57] ABSTRACT

The present invention provides a new and improved method of producing a dustless vinyl halide polymer color concentrate that does not require the formation of a hot melt or the use of wax. The color concentrate comprises a multitude of fine particles which each comprise a vinyl halide polymer resin core and a colorant material shell. The method includes the steps of providing a vinyl halide polymer, providing a colorant material, providing a compatibilizer having a solubility parameter of from about 7 to about 12 $(cal/ml)^{1/2}$, and mixing the vinyl halide polymer, compatibilizer and colorant material together to yield the dustless concentrate in the form of a vinyl halide resin core surrounded by a shell of the compatibilzer and the colorant material.

21 Claims, No Drawings

VINYL HALIDE POLYMER COLOR CONCENTRATE

This is a continuation of application Ser. No. 08/524,077 filed on Sep. 6, 1995 which is a continuation of Ser. No. 08/170,460 filed on Dec. 20, 1993 both now abandoned.

FIELD OF INVENTION

The present invention concerns a color concentrate for use in coloring plastics. More particularly, the present invention concerns a dustless solid color concentrate comprising a vinyl halide polymer resin core and a colorant material additive shell.

BACKGROUND

The traditional method for incorporating dry colors and additives into a thermoplastic polymer to produce a color concentrate involves blending the polymer with the color and additives in a melt, the melt being formed in an extruder or a batch type mixer such as a Banbury mixer. The disadvantages associated with these techniques include appreciable downtime for cleaning the equipment, high-energy costs for running the equipment, and long production cycles. Additionally, with respect to some polymer resins, the traditional method of processing can lead to the degradation of the polymer and/or the creation of an undesirable heat history.

Various attempts have been made to avoid using traditional methods in the production of color concentrates. One of these methods is disclosed in Aubrey et al., U.S. Pat. No. 3,591,409. Aubrey et al. discloses a method for preparing coated resin granules wherein a mixture of resin granules, a wax and a particulate material is subjected to high-intensity blending at elevated temperatures. The Aubrey et al. process is applicable to a variety of thermoplastic resins including polyolefins, vinylidene polymers, polyamides and other polymers. One disadvantage associated with the Aubrey et al. process is that the wax employed has to be melted for the process to work. This makes it difficult to determine how much wax is required in order to coat the resin. Additionally, the wax may be considered in some applications to be a costly additive and/or an undesirable additive. For example, waxes can melt in the screw of an extruder or injection molding machine and this can cause lubrication of the screw and loss of production efficiency or rate.

Another method for incorporating color and additives into a polymer resin is described in Chatterjee et al., European Patent Publication No. 0,471,463A2. Chatterjee et al. discloses the use of high-speed impingement to incorporate color and additives into a polymer resin. This process, like the process disclosed in Aubrey et al., may be used to process a variety of polymers. A disadvantage associated with this process is that it requires the melting of the additive and/or the surface of the polymer resin to promote the incorporation of the additive into the polymer resin. If the processing temperature is higher than the optimum temperature, the entire polymer resin particle can melt, resulting in a large molten mass or a large proportion of agglomerates instead of a uniform powder size.

Another method for incorporating color and additives into a polymer resin is described in Pennie et al., U.S. Pat. No. 4,375,520. The method comprises the mixing in a Papenmeir mixer of a liquid polymeric substance and a low molecular weight polymer having a melting point in the range of about 95° C. to 105° C. Pennie et al. is specific to the use of a polymer having a melting point of about 95° C. to 105° C. and the process is conducted at or near the melting point of the polymer. Unfortunately, Pennie et al. does not provide any insight into how to process a primarily amorphous polymer resin that does not display a melting point, such as poly(vinyl chloride) (PVC).

SUMMARY OF INVENTION

The present invention provides a new and improved method of producing a dustless vinyl halide polymer color concentrate that does not require the formation of a hot melt or the use of wax. The color concentrate comprises a multitude of fine particles which each comprise a vinyl halide polymer resin core and a colorant material shell. The method includes the steps of providing a vinyl halide polymer, providing a colorant material, providing a compatibilizer having a solubility parameter of from about 7 to about 12 $(cal/ml)^{1/2}$, and mixing the vinyl halide polymer, compatibilizer and colorant material together to yield the dustless concentrate in the form of a vinyl halide resin core surrounded by a shell of the compatibilzer and the colorant material.

In a preferred embodiment the vinyl halide polymer comprises poly(vinyl chloride) (PVC) and the compatibilizer comprises epoxidized soybean oil.

These and other aspects of the present invention will become clear to those skilled in the art upon the reading and understanding of the specification and the claims below.

DETAILED DESCRIPTION

Color concentrates made in accordance with the principles of the present invention yield various advantages. These advantages include for example: (i) the production of a non-dusting, free flowing, uniform particle size concentrate; (ii) the production of a concentrate that provides good dispersion when added to the thermoplastic being colored; (iii) the absence of melt extrusion or melt formation during production of the concentrate which can create an undesirable heat history; (iv) the absence of costly waxes that may cause processing problems or detrimental properties; (v) batch size flexibility; (vi) no screw slippage when the concentrate is added to an extruder; (vii) faster color changes; (viii) the absence of additives or other materials that can be detrimental to the properties of the vinyl halide polymer resin; and (ix) good yields during the production of the concentrate.

Generally, the method comprises the steps of providing a vinyl halide polymer resin, providing a compatibilizer having a solubility parameter of from about 7 to about 12 $(cal/ml)^{1/2}$, providing one or more colorant materials, and mixing the polymer resin, colorant and compatibilizer in a mixing device such as a Henschel mixer.

The vinyl halide polymer resin may comprise one or more of the commercially available polymer resins. Such polymers include, for example, poly (vinyl chloride) including homopolymers and copolymers thereof, alloys and blends comprising homopolymers and copolymers of poly(vinyl chloride), poly(vinyl fluoride) including homopolymers and copolymers thereof, poly(vinylidene dichloride) including homopolymers and copolymers thereof and chlorinated poly (vinyl chloride) including homopolymers and copolymers thereof. The vinyl halide polymer resin preferably has an average particle size in the range of about 70 microns to about 500 microns. More preferably, the vinyl halide polymer resin has a particle size in the range of about 150 microns to about 250 microns.

The compatibilizer is a material that is liquid below 150° F. and capable of being absorbed by the pigments and vinyl halide polymer resin being utilized. The compatibilizer has a solubility parameter of from about 7 to about 12 (cal/ml)$^{1/2}$. More preferably, the compatibilizer has a solubility parameter of from about 8.5 to about 10.5 (cal/ml)$^{1/2}$. Examples of preferred compatibilizers include epoxidized soybean oil, epoxidized tall oil, epoxidized linseed oil, ethoxylated sorbitan trioleate, sorbitan trioleate, tri-iso-octyl phosphate, octyl diphenyl phosphate, tolyl diphenyl phosphate, tritolyl phosphate, trixylyl phosphate, triphenyl phosphate, di-n-butyl phthalate, di-2-ethylhexyl phthalate, di-n-hexyl phthalate, di-iso-octyl phthalate, di-n-octyl phthalate, di-isodecyl phthalate, di-tridecyl phthalate, n-Butyl benzyl phthalate, di-2-methoxyethyl phthalate, butyl butoxycarbonylmethyl phthalate, di-2-ethylhexyl adipate, iso-octyl isodecyl adipate, di-isodecyl adipate, di-2-ethylhexyl azelate, di-iso-octyl azelate, di-2-ethylhexyl sebacate, and chlorinated paraffin extender. Preferably, when using poly(vinyl chloride) as the polymer resin, the compatibilizer comprises epoxidized soybean oil.

The colorant material may comprise any one or more of a number of commercially available colors or pigments. As used in this specification and claims below "colorant material" means any conventional inorganic or organic pigment or organic dyestuff. Such materials are described, for example, in *Kirk-Othmer Encyclopedia of Chemical Technology*, Third Edition, Vol. 6, pp. 597–617, which is incorporated herein by reference. Examples of inorganic pigments include, for example, titanium dioxide, iron oxide, zinc chromate, cadmium sulfides, chromium oxides and sodium aluminum silicate complexes. Examples of organic type pigments include azo and diazo pigments, phthalocyanines, quinacridone pigments, perylene pigments, isoindolinone, anthraquinones, thioindigo and solvent dyes.

Various types of additives may also be included in the process. Such additives may include, for example, stabilizers such as alkaline earth metal soaps and carboxylates such as calcium benzoate, calcium octoate and calcium naphthenate, Friedel-Crafts cation progenitor compounds such as zinc oxide, zinc hydroxide, zinc carbonate, zinc acetate, zinc laurate, zinc naphthenate, zinc stearate, zinc oleate, zinc 2-ethyl-hexoate, cadmium oxide, cadmium hydroxide, cadmium carbonate, cadmium acetate, cadmium laurate, cadmium naphtheneate, cadmium stearate, cadmium oleate, cadmium 2-ethyl-hexoate, calcium stearate, aluminum oxide, aluminum hydroxide, aluminum carbonate, aluminum acetate, aluminum chlorolaurate, antimony oxide, antimony hydroxide, antimony carbonate, antimony naphthenate, tin oxide, tin hydroxide, tin carbonate, tin naphthenate, and tin 2-ethyl-hexoate, aliphatic polyhydric compounds such as trimethylolethane, trimethylolpropane, tetramethylolcyclohexanol, pentaerythritol, dipentaerythritol, and tripentaerythritol and tri-(2-hydroxyethyl) iso-cyanurate (THEIC).

Various types of fillers and/or reinforcers may also be included in the process. Such fillers and/or reinforcers include, for example, $CaCO_3$ talc, glass, clay and mica.

The portions of vinyl halide polymer resin, color and compatibilizer can vary quite a bit. Generally, when producing the concentrate, the mixture utilized comprises from about 20 to about 60 weight percent vinyl halide polymer, from about 5 to about 20 weight percent compatibilizer and from about 25 to about 75 weight percent colorant material. The mixture may comprise up to 15 weight percent additive. Preferably, the mixture comprises from about 25 to about 55 weight percent vinyl halide polymer, from about 10 to about 15 weight percent compatibilizer, and from about 30 to about 70 weight percent colorant material.

Various high-intensity mixing devices may be utilized in accordance with the principles of the present invention. Such devices include, for example, Papenmeir mixers, Waring blenders and Henschel mixers. Preferably, a Henschel mixer is employed. Generally, the mixing device is operated at a tip speed of from about 10 to about 60 meters/second. Preferably, the mixing device is operated at a tip speed of from about 20 to about 40 meters/second.

Generally, if an additive is employed, it is best when producing the concentrate to first mix the additive with the vinyl halide polymer resin for a brief period such as 10 to 20 seconds. The colorant material then can be added and mixed for 10 to 20 seconds. The compatibilizer is then added and mixed for 3 to 10 minutes. Of course, it will be appreciated that these are merely general mixing times and the actual mixing times will depend on such variables as, for example, the size of the mixing container, the amount and type of materials being mixed and the speed and configuration of the mixing blade.

Care must be taken not to allow the mixture during the mixing operation to exceed the degradation temperature of the polymer resin (215° F. for PVC). Thus, when working with PVC a maximum of about 210° F. should be attained. To obtain a free-flowing concentrate, the mixing should be conducted until a temperature of from about 140° F. to about 180° F. is reached, and preferably from about 150° F. to about 180° F. is reached. Excessively high temperature should be avoided because it can cause the vinyl halide polymer resin to degrade. If during mixing smearing should result, metal stearates, such as calcium stearate, can be added to the mixture to prevent smearing. Generally, such additions are made in the range of 0.5% to about 1%. Addition of metal stearates to the mixer may result in the formation of a fragile ball. However, such ball will readily break up into free-flowing particles with a gentle tap.

After mixing the mixture is generally passed through a sieve in order to remove oversize aggregates. Generally, a yield of over 90% by weight is attained. After sieving the mixture comprises a non-dusting, free-flowing, uniform particle size concentrate. The concentrate generally comprises a multitude of particles having an average particle size of from about 150 to about 850 microns. Each particle comprises a vinyl halide polymer resin core and an outer coating of compatibilizer, colorant materials and additives. The resin cores have a diameter of from about 70 microns to about 500 microns.

Any number of let-down resins can be used in connection with the color concentrates of the present invention. For example, the let-down resin can be either flexible or rigid PVC compounds or any other polymers compatible with the vinyl halide resin used to produce the color concentrate. The color concentrates of the present invention are used in the same manner as conventional concentrates (i.e., dry blending with the let-down resin followed by extrusion). Let-down ratios vary depending on the desired colors and applications. In general, the ratio ranges from about 10:1 to about 100:1.

During manufacture the ultimate color of the color concentrate can be easily controlled or corrected. More particularly, before adding the compatibilizer one can conduct a color check on the colorant material and vinyl halide polymer resin using any one of a number of conventional techniques, such as, for example, melt mixing with the let-down resin. If the color of the melt is found to be unacceptable, additional colorant materials can be added during manufacture prior to the addition of the compatibilizer so as to adjust the color as required.

The following examples will serve to illustrate the novel features and advantages of the present invention. While these examples will show one skilled in the art how to operate within the scope of this invention, they are not to serve as a limitation on the scope of the invention for such scope is only defined in the claims below.

EXAMPLE I

The following components were charged into a FM150 Henschel mixer having a 150 liter mixing chamber. The mixer was operated at a tip speed of 20 meters/second using a variant-type mixing blade.

| Component | Weight % | Weight |
| --- | --- | --- |
| GEON 110 × 334 PVC | 37 | 35.15 lbs. |
| Ferro Corporation V6797 mixed metal oxide pigment | 50 | 47.5 lbs. |
| Calcium stearate | 3 | 2.85 lbs. |
| Ferro Corporation THERM-CHEK 840 stabilizer | .5 | .475 lbs. |
| Epoxidized soybean oil | 9.5 | 9.025 lbs. |

The PVC and the THERM-CHEK 840 stabilizer are mixed separately for 15 seconds. The calcium stearate and mixed metal pigment are then added and mixed for 15 seconds. The epoxidized soybean oil is then gradually added and mixed for five minutes yielding a mixture of free-flowing fine particles. The fine particles are then passed through a 20 mesh screen yielding about 2% oversized particles that do not pass through the screen. The sieved particles are ready for use as a color concentrate. The oversize particles can be ground and used in subsequent batches without causing any detrimental effects.

EXAMPLE II

The following components were charged into a FM150 Henschel mixer having a 150 liter mixing chamber. The mixer was operated at a tip speed of 20 meters/second using a variant-type mixing blade.

| Component | Weight % | Weight |
| --- | --- | --- |
| Carbon black | 1.6 | 1.52 lbs. |
| Ethylene bis-stearamide | 2 | 1.9 lbs. |
| Calcium carbonate | 30 | 28.5 lbs. |
| Calcium stearate | 2.5 | 2.38 lbs. |
| Vygen 310 PVC | 55.4 | 52.6 lbs. |
| Epoxidized soybean oil | 8 | 7.6 lbs. |
| Ferro Corporation THERM-CHEK 840 stabilizer | .5 | .48 lbs. |

The PVC and the THERM-CHEK 840 stabilizer are mixed separately for 15 seconds. 1.9 pounds of the calcium stearate, the carbon black, the ethylene bis-stearamide and the calcium carbonate are then gradually added and mixed for 15 seconds. The epoxidized soybean oil is then added and mixed for about 5 minutes. Finally, 0.48 pounds of the calcium stearate is added and mixed for 30 seconds to eliminate smearing. The calcium stearate added in the final step coats each of the fine particles that are produced. The fine particles are then passed through a 20 mesh screen yielding about 2% oversize particles that do not pass through the screen. The sieved particles are ready for use as a color concentrate. The oversized particles can be ground and used in subsequent batches without causing any detrimental effects.

EXAMPLE III

The color concentrate made as described in Example I was used at a 33:1 let-down ratio with a white rigid PVC compound. The two materials were dry blended and melt extruded to make a 1" diameter gray PVC pipe. The materials extruded well and the pipe has good appearance with good pigment dispersion.

EXAMPLE IV

The color concentrate made as described in Example II was used at a 20:1 let-down ratio with a white rigid PVC compound. The two materials were dry blended and melt mixed on a two-roll mill to make a gray PVC sheet. The materials processed well and the sheet had good appearance with good pigment dispersion.

Although the invention has been shown and described above with respect to specific embodiments, it is obvious that equivalent alterations and modifications will occur to others skilled in the art upon reading and understanding the specification. The present invention includes all such equivalent alterations and modifications, and is limited only by the scope of the following claims.

We claim:

1. A method of producing a dustless, free-flowing vinyl halide polymer color concentrate comprising particles each comprising a vinyl halide polymer resin core and a colorant material shell, said method comprising the steps of:
   A. providing a vinyl halide polymer;
   B. providing an epoxidized vegetable oil;
   C. providing a colorant material;
   D. mixing said vinyl halide polymer, said epoxidized vegetable oil and said colorant in a container at a temperature from about 140° F. to about 180° F. to provide a mix and form said color concentrate comprising particles, wherein the color concentrate is free of wax.

2. A method as set forth in claim 1 wherein said vinyl halide polymer comprises poly(vinyl chloride).

3. A method as set forth in claim 1 wherein said mixing step D is conducted using a high intensity mixer with a tip speed of from about 20 to about 40 meters/second.

4. A method as set forth in claim 1 wherein said container is maintained at a temperature below the degradation and melting temperatures of said vinyl halide polymer.

5. A method as set forth in claim 1 wherein said mixing step D is conducted using a Henschel mixer.

6. A method as set forth in claim 1 including the step of providing an additive material and mixing said additive material with said vinyl halide polymer, said compatibilizer and said colorant during said step D.

7. A method as set forth in claim 1 wherein during said step D said vinyl halide polymer, said compatibilizer and said colorant material are mixed at a temperature of from about 140° F. to about 180° F.

8. A method as set forth in claim 1 wherein during said step D said vinyl halide polymer, said compatibilizer and said colorant material are mixed at a maximum of about 210° F.

9. A method as set forth in claim 1 wherein the mix of said step D comprises from about 20 to about 60 weight percent vinyl halide polymer, from about 5 to about 20 weight percent expoxidized vegetable oil, and from about 25 to about 75 weight percent colorant material.

10. A method as set forth in claim 1 wherein the mix of said step D comprises from about 25 to about 55 weight percent vinyl halide polymer, from about 10 to about 15 weight percent compatibilizer, and from about 30 to about 70 weight percent colorant material.

11. A method as set forth in claim 1 wherein said vinyl halide polymer of said step A has an average particle size of from about 70 microns to about 500 microns.

12. A method as set forth in claim 1 wherein said vinyl halide polymer of said step A has an average particle size of from about 250 microns to about 500 microns.

13. A method as set forth in claim 1 wherein said compatibilizer of said step B has a solubility parameter of from about 8.5 to about 10.5 $(cal/ml)^{1/2}$.

14. A method as set forth in claim 1 including the step of providing an additive and mixing said additive with said mix during said step D.

15. A method as set forth in claim 1 wherein said colorant material comprises an inorganic pigment.

16. A method as set forth in claim 1 wherein said colorant material comprises an organic pigment.

17. A method as set forth in claim 1 wherein said color concentrate comprises a free-flowing particles which display an average particle size of from about 150 microns to about 850 microns, said particles comprising a vinyl halide polymer core and an outer coating of compatibilizer and colorant material.

18. A method as set forth in claim 14 wherein said additive comprises calcium stearate.

19. A method of producing a dustless, free-flowing vinyl halide polymer color concentrate comprising particles each comprising a vinyl halide polymer resin core and a colorant material shell, said method comprising the steps of:

A. providing a vinyl halide polymer;

B. providing a compatibilizer selected from epoxidized soybean oil, expoxidized tall oil, and epoxidized linseed oil;

C. providing a colorant material;

D. mixing said vinyl halide polymer, said compatibilizer and said colorant in a container at a temperature up to about 210° F. to provide a mix and form said color concentrate comprising particles, wherein the color concentrate is free of wax.

20. A method of producing a dustless, free-flowing vinyl halide polymer color concentrate comprising fine particles each comprising a vinyl halide polymer resin core and a colorant material shell, said method comprising the steps of:

A. providing a vinyl halide polymer,

B. providing a compatibilizer selected from epoxidized soybean oil, epoxidized tall oil, epoxidized linseed oil, and ethoxylated sorbitan trioleate, C. providing a colorant material;

D. mixing said vinyl halide polymer, said compatibilizer and said colorant in a mixer operated at a tip speed from about 10 to about 60 meters/second and at a temperature up to about 210° F. to provide a mix and form said color concentrate comprising particles, wherein the mix is free of wax.

21. A method of claim 1 wherein said mixing step is accomplished by adding said vinyl halide polymer and colorant material first, and wherein a color check is performed on said vinyl halide polymer and colorant materials prior to addition of the compatibilizer.

* * * * *